United States Patent [19]

Fulford

[11] Patent Number: 5,286,472
[45] Date of Patent: Feb. 15, 1994

[54] HIGH EFFICIENCY PROCESS FOR PRODUCING HIGH PURITY ALUMINA

[75] Inventor: George D. Fulford, Kingston, Canada

[73] Assignee: Alcan International Limited, Montreal, Canada

[21] Appl. No.: 800,880

[22] Filed: Nov. 27, 1991

Related U.S. Application Data

[63] Continuation of Ser. No. 441,817, Nov. 27, 1989, abandoned.

[51] Int. Cl.$^5$ .............................................. C01F 7/02
[52] U.S. Cl. ..................................... 423/625; 165/104.16
[58] Field of Search ................ 423/625; 422/142, 146; 165/104.13, 104.15, 104.16

[56] References Cited

U.S. PATENT DOCUMENTS

| | | | |
|---|---|---|---|
| 2,715,018 | 8/1955 | Lapple et al. | 422/146 |
| 2,715,548 | 8/1955 | Fish | 422/142 |
| 2,919,905 | 1/1960 | Bayard | 422/146 |
| 3,156,538 | 11/1964 | Schneider | 422/146 |
| 3,307,921 | 3/1967 | Junginger | 423/522 |
| 3,336,109 | 8/1967 | du Bellay et al. | 423/625 |
| 3,529,356 | 9/1970 | Diettrich | 34/9 |
| 3,565,408 | 2/1971 | Reh et al. | 423/625 |
| 3,579,294 | 5/1971 | Tamise et al. | 423/121 |
| 4,158,036 | 6/1979 | Jaffe et al. | 422/142 |
| 4,224,288 | 9/1980 | Potter | 423/123 |
| 4,250,774 | 2/1981 | Kraxner et al. | 432/15 |
| 4,352,660 | 10/1982 | Steiner et al. | 432/14 |
| 4,476,816 | 10/1984 | Cannon et al. | 165/104.16 |
| 4,499,944 | 2/1985 | Komakine | 422/146 |
| 4,529,579 | 7/1985 | Raahauge | 423/625 |
| 4,585,645 | 4/1986 | Sucech | 423/625 |
| 4,746,492 | 5/1988 | Marlair | 422/146 |

FOREIGN PATENT DOCUMENTS

| | | | |
|---|---|---|---|
| 2356060 | 5/1975 | Fed. Rep. of Germany | 432/58 |
| 2112229 | 6/1972 | France . | |
| 2453373 | 10/1980 | France . | |
| 309912 | 9/1955 | Switzerland . | |
| 1248817 | 10/1971 | United Kingdom . | |
| 1283740 | 8/1972 | United Kingdom . | |
| 1599398 | 9/1981 | United Kingdom . | |

OTHER PUBLICATIONS

Dunn et al, "Heat Pipes", Permagon Press, 1976, pp. 1–7, 236–237, 248–250.
John C. Olsen, "Unit processes and principles of Chemical Engineering", Chapter 1, pp. 1–3.
Webster's Third New International Dictionary, G. & E. Merriam Co., 1976, pp. 2126 & 2374.
Kern, "Process Heat Transfer", 1950, pp. 484–487, 866, 869.

*Primary Examiner*—Michael Lewis
*Assistant Examiner*—N. M. Nguyen
*Attorney, Agent, or Firm*—Cooper & Dunham

[57] ABSTRACT

A process for producing alumina is described in which the efficiency of calcination is greatly improved by utilizing a total heat exchange system in which alumina hydrate is heated stepwise in a plurality of heat exchange stages to sequentially higher temperatures approaching calcining temperatures and is then fed to a calciner for final conversion to alumina, and the calcined alumina is cooled in a plurality of heat exchange stages, with sensible heat being transferred from the calcined alumina cooling stages to the alumina hydrate heating stages at a temperature in each stage only slightly higher than the temperature of a heating stage or at which the heat is consumed in that stage. Further efficiency in the system may be obtained by predrying the alumina hydrate to remove superficial moisture using air from the system. Furthermore, exhaust gases from the calciner may be used to preheat combustion and fluidizing air for the calciner.

9 Claims, 1 Drawing Sheet

HIGH EFFICIENCY PROCESS FOR PRODUCING HIGH PURITY ALUMINA

This is a Continuation of application Ser. No. 441,817, filed Nov. 27, 1989 now abandoned.

This invention relates to the production of alumina and, more particularly, to the production of alumina with minimum external energy costs.

Alumina is produced in large quantities from the mineral bauxite. In the typical commercial process, bauxite is dissolved in digesters using caustic liquors at elevated temperatures. The solution from the digesters, after removal of insoluble tailings, is cooled and seeded to precipitate alumina trihydrate. This trihydrate is filtered from the spent liquors, washed and then converted by high temperature calcination into high grade alumina, which is a raw material for the production of aluminum metal by electrolysis. The filtered and washed trihydrate contains, in addition to chemically combined water, a substantial amount of uncombined moisture.

In prior art systems, large quantities of fuel are required to vaporize uncombined water and heat the dried alumina trihydrate whereby it passes through a series of intermediate crystalline forms prior to reaching the final anhydrous and inert alumina form. Because of purity requirements, a noble fuel such as natural gas or low-ash fuel oil is normally used for this purpose. Such fuels are expensive and will be scarce in the future.

Some attempts have been made at energy conservation and, for instance, Potter U.S. Pat. No. 4,224,288, issued Sep. 23, 1980, describes a process in which the wet alumina trihydrate is dried by being heated indirectly from steam obtained from the preliminary digestion and caustic recovery system.

Diettrich, U.S. Pat. No. 3,529,356 describes a staged, fluidized bed heat exchange for dehydrating alumina hydrates. In this system, exhaust furnace gases are used as the source of heat in the heat exchanger stages for preheating the incoming alumina trihydrate.

The prior processes have utilized energy conservation in only individual parts of the total system and have made no attempt to find an optimum energy saving system. Thus, while the thermal efficiency of some of the known calcination processes may be reasonably high, the efficiency with which the availability of the energy to do work is utilized is poor in such processes.

An analysis of the reactions occurring during the calcination of alumina trihydrate to alumina indicates that by far the greatest part of the thermal energy is required only at low to moderate temperatures, i.e. below 500° C., and that only a relatively small fraction of the total heat input is required and little is consumed at high temperatures in the order of 500°–1,100° C. The low temperature energy below about 500° C. is largely consumed in removing combined water, while the high temperatures provide the sensible heat for raising the intermediate aluminas to the temperature at which recrystallization to the required more inert product forms will occur. The actual consumption of heat occurring in these final steps has been found to be small and, in fact, the final recrystallization is found to be somewhat exothermic.

It is the object of the present invention to provide a total heat exchange system which will take advantage of the above reaction temperature analysis.

SUMMARY OF THE INVENTION

It has now been found that the efficiency of the calcining system can be greatly improved by utilizing a total heat exchange system in which the alumina hydrate is heated stepwise in a plurality of heat exchange stages to sequentially higher temperatures approaching calcining temperatures and is then fed to a calciner for final conversion to alumina, and the calcined alumina is cooled in a plurality of heat exchange stages, with heat being transferred from the calcined alumina cooling stages to the alumina hydrate heating stages at a temperature in each cooling stage only slightly higher than the temperature of a heating stage at which the heat is required and/or consumed in that stage.

In the calcining process to which the present invention relates, there are four basic heating stages which must be carried out between the wet alumina trihydrate and the final calcined alumina product. These stages are:

1. Initial Drying

This is a predrying step carried out to remove uncombined moisture from wet alumina trihydrate. It is typically at a temperature of about 100° C. or less and consumes appreciable amounts of thermal energy.

2. Removal of Combined Water

The dry alumina trihydrate is heated to moderate temperatures to remove chemically combined water. The combined water is usually completely removed below 500° C. and in some instances may be fully removed at temperatures below 300° C. This stage is a major consumer of thermal energy.

3. Intermediate Crystalline Forms

After the chemically combined water has been removed, sensible heat is provided at increasing temperatures to change the alumina through a series of intermediate crystalline forms or phases and raise the temperature to only slightly below calcining. These changes consume a relatively small amount of heat.

4. Calciner

The intermediate crystalline alumina is subjected to calcining temperature in excess of 900° C. to form the final anhydrous, inert alumina. The final recrystallization stages tend to be somewhat exothermic.

The stages of removing combined water from the superficially dry alumina trihydrate and the heating of the hydrate through intermediate crystalline forms are carried out by a stepwise heating procedure in a plurality of heat exchange stages. This is preferably done in a cascading fluidized bed heating unit and in order to raise the temperature of the hydrate from about 100° C. to about 800°–1,000° C., about 8 to 10 cascading stages are preferably used.

The anhydrous, inert alumina is discharged from the calciner at a temperature of about 900°–1,100° C. and this hot calcined product is a source of a very large amount of sensible heat energy. In order to take full advantage of this heat energy, the hot calcined alumina is preferably cooled in a second cascading fluidized bed arranged in close proximity to the heating cascading bed. It is particularly preferable to position the cooling cascading bed directly beneath the heating cascading bed countercurrently such that the hottest section of the heating cascade is above the hottest section of the cooling cascade and the coolest section of the heating cascade is directly above the coolest section of the cooling cascade. With this arrangement, heat exchange means are provided between the adjacent sections of the two cascading sections. In other words, the hottest sections of each cascading system are connected by a heat exchange unit and additional heat exchange units are provided between each adjacent pair of sections down to the coolest sections of the two cascading systems. For efficient heat exchange to take place between adjacent heating cascade sections and cooling cascade sections, each heating cascade section should be about 100°-150° C. or more lower in temperature than the adjacent cooling cascade section to which it is connected for heat exchange.

The heat exchange units between adjacent cascading sections can be selected from known devices. While any standard heat exchange system capable of handling the required temperatures may be used, it has been found to be particularly advantageous to use heat pipes or thermal syphons, arranged in clusters, between adjacent sections. Details of such heat pipes which are sealed heat exchanger units are described in Dunn & Reay "Heat Pipes", Pergamon Press, 1976. For heat exchange at the lower temperature end of the system, stainless steel may be used for the pipes with water as the working fluid. At higher temperatures approaching 1,000° C., it is preferable to use Hastelloy pipes with sodium as the working fluid.

With the heat exchange system of this invention, the sensible heat required for raising the temperature of the alumina through the intermediate crystalline forms or phases and up to a temperature of 900° to 1,000° C. can be entirely supplied by heat exchange from the cooling cascade. Part of the thermal energy required for removing the chemically combined water at lower temperatures can also be supplied by heat exchange from the cooling cascade. However, because the removal of chemically combined water is such a major consumer of thermal energy in the system, some external thermal energy is required at this stage and this can conveniently be supplied by coils submerged in appropriate stages of the fluidized bed heating cascade through which steam or other heat transfer medium is circulated. This steam can be obtained from a plant steam system or as steam from a steampowered electric power generator. The heating coils can be utilized at several points along the low temperature end of the system by, for example, providing sequentially a low pressure steam coil, an intermediate pressure steam coil and a high pressure steam coil.

When steam is supplied to the coils from a steampowered electric power generator, it is preferable to generate steam at high pressure and use this to drive a steam turbine. Steam is then extracted from the turbine at different pressures commensurate with the pressures required for the desired temperature in each heating coil. Cheap, non-noble fuels may be used to generate the high pressure steam to power the turbine.

Since the heating and cooling cascades are fluidized beds, fluidizing air is being passed through the cascades and this air picks up heat. This heated air from the cascades can conveniently be used in a predryer for the initial partial or complete drying of the alumina trihydrate to remove uncombined moisture.

The calciner unit used in this invention may conveniently be a small fluid bed furnace. Fluidizing and combustion air is fed into the calcining furnace together with a noble fuel, such as natural gas or low ash fuel oil. The fuel is burned within the furnace to supply the increment of heat required to raise the temperature of the alumina discharging from the heating cascade to the calcining range. Very hot exhaust gases are discharged from the calciner and these represent a further source of thermal energy. Accordingly, it is preferable to conduct a heat exchange between the hot exhaust gases from the calciner and the fluidizing combustion air entering the calciner. For instance, the exhaust gases may discharge from the calciner at a temperature in the order of 1,000° and this may be used to heat the fluidizing and combustion air entering the calciner to approximately 850° C., using known heat exchange systems.

There are numerous benefits and advantages which may be achieved with the system of this invention. Firstly, only very small quantities of additional fuel are required for raising the temperature of the alumina to calcining temperatures and, moreover, because the temperature of the incoming hydrate particles is increased in many small steps rather than a few very large jumps in temperature as is used in existing equipment, thermal shock to the particles is greatly reduced. Such thermal shock may result in rupture of the particles, caused by explosive release of vapourized liquid inclusions. Also compared to existing systems, the system of the present invention has greatly reduced gas velocities which decreases particle attrition and wear on the system.

Another advantage of the system of the present invention is that the exhaust gases from the calciner contain only very small amounts of moisture produced from the fuel added to the calciner. Also because of the small amount of fuel added at this point, the exhaust gases contain very small amounts of sulphur. This greatly reduces the corrosive effects in the recovery system and heat exchange system following the calciner. Corrosion in the hydrate predryer is also reduced because the fluidizing air contains moisture, but no sulphur compounds.

BRIEF DESCRIPTION OF THE DRAWINGS

In order that the present invention may be better understood, a preferred embodiment thereof will now be described by way of example with reference to the accompanying drawings in which.

DESCRIPTION OF A PREFERRED EMBODIMENT

Figure 1:
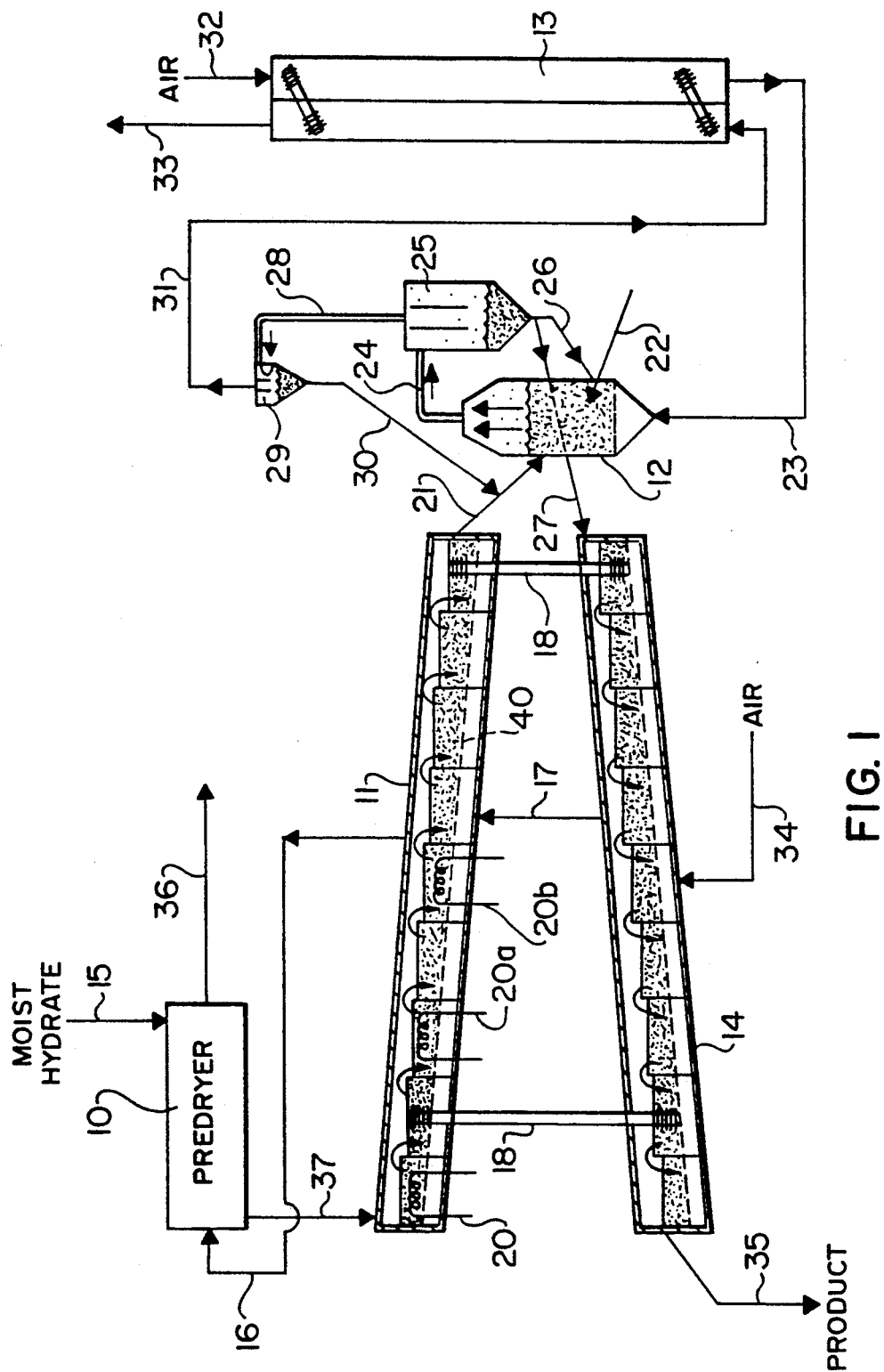
FIG. 1 is a schematic diagram of a heat recovery system in a plant for the production of alumina.

With reference to FIG. 1, the system includes a predryer 10 for drying moist hydrate, a heating cascade 11, a calciner 12, a gas/gas heat exchanger 13 and a cooling cascade 14.

Moist hydrate 15 at a temperature of about 50° C. is fed into a drying unit 10 where it is contacted with a stream of air 16 having a temperature of at least 100° C. The air discharges from predryer 10 via outlet line 36 at a temperature of about 70° C.

The dry hydrate in the form of alumina trihydrate is discharged via outlet line 37 and enters the top end of a heating cascading fluidized bed unit 11. This unit is of known type for heating or cooling particulate material and includes a plurality of cascading sections with an air-permeable bottom structure 40 through which fluidizing air passes. The fluidizing air is fed in through inlet line 17 and is discharged through outlet line 16. Heat is transferred to the heating cascade 11 from cooling cascade 14 by means of heat transfer units 18.

These heat transfer units 18 are clusters of heating tubes of the type referred to above and it will be seen that these are positioned generally vertically between adjacent cascading sections of units 11 and 14. For the sake of simplicity, only two heat pipes 18 are shown but it will be appreciated that in this particular embodiment nine heat transfer units, each consisting of a cluster of heat pipes, connect the nine heating cascade sections to the nine cooling cascade sections.

Further heat may be supplied to the lower temperature end of the heating cascade section 11 by way of submerged heat coils 20, 20a and 20b. Coil 20 at the lowest temperature end is supplied with a low pressure steam, while coil 20a is supplied with a medium pressure steam and coil 20b is supplied with a high pressure steam.

During its passage through the cascading fluidized bed 11, the alumina trihydrate firstly loses its chemically combined water, then passes through a series of intermediate crystalline forms. This alumina at a temperature of about 900°–1,000° C. discharges from the lower end of cascading fluidized bed 11 via discharge line 21 into calciner 12. Within the calciner unit, further heat is applied by means of liquid fuel 22 and combustion air 23, raising the temperature to about 950°–1,100° C. This combustion air is drawn in through inlet 32 and is preheated in heat exchanger 13.

The anhydrous, inert alumina product formed in the calciner discharges through outlet line 24 and into a cyclone separator 25 with fines being drawn off through line 28 and cyclone 29. In the cyclone 29 the fines are separated from the exhaust gases with the fines being recycled via line 30 into the inlet to the calciner and/or to the discharge of the calciner and the exhaust gas being carried via line 31 through heat exchanger 13 and out through outlet line 33, this exhaust gas serving to preheat the inlet air 32 within the heat exchanger 13.

The alumina product from the bottom of cyclone separator 25 may be partially recycled to calciner 12 via line 26 with the balance being fed via line 27 into the upper end of a cooling cascade 14. This unit includes a plurality of cascading sections in the manner of heating cascade 11 with the fluidizing air being fed in through line 34 and the product being discharged through line 35. The product enters the cooling cascade 14 at about 950°–1,100° C. and exits at about 150° C.

While in the foregoing specification this invention has been described in relation to a certain preferred embodiment thereof, and many details have been set forth for the purpose of illustration, it will be apparent to those skilled in the art that the invention is susceptible to additional embodiments and that certain of the details described herein can be varied considerably without departing from the basic principles of the invention.

I claim:

1. A process for producing calcined alumina from aluminous material initially constituted of alumina trihydrate containing uncombined water, comprising:
   (a) removing uncombined water from the material;
   (b) advancing the material through a first cascade of fluidized bed stages having a first stage to which the material is delivered from step (a), a last stage, and a plurality of intermediate stages through which the material successively advances from the first stage to the last stage, while heating the material stepwise to sequentially higher temperatures in successive stages, for removing combined water from the material and then further elevating the temperature of the material, with passage of the material through intermediate crystalline forms, to a discharge temperature of about 800°–1000° C., such that the stages of said first cascade of fluidized beds have sequentially increasing temperatures from first to last stage;
   (c) feeding the material from said last stage to a calciner and therein calcining the material; and
   (d) advancing the hot calcined material from the calciner through a second cascade of fluidized bed stages having a first stage to which the material is delivered from step (c), a last stage, and a plurality of intermediate stages through which the material successively advances from the first stage to the last stage, while cooling the material stepwise to sequentially lower temperatures in successive stages, such that the stages of said second cascade of fluidized beds have sequentially increasing temperatures from last to first;
   (e) wherein the stages of said first cascade of fluidized beds are respectively disposed adjacent and respectively individually connected by separate sealed heat-exchange units to the stages of said second cascade of beds in order of increasing temperature such that the first stage of the first cascade is adjacent and individually connected by one heat-exchange unit to the last stage of the second cascade, the last stage of the first cascade is adjacent and individually connected by another heat-exchange unit to the first stage of the second cascade, and each intermediate stage of the first cascade is adjacent and individually connected by a separate heat-exchange unit to a separate one of the intermediate stages of the second cascade, the temperature of each stage of the first cascade being lower than that of the stage of the second cascade to which it is adjacent and connected for heat exchange; and
   (f) wherein the step of heating the material in the fluidized bed stages of the first cascade comprises separately transferring heat to each stage of the first cascade from that one stage of the second cascade to which it is adjacent and connected for heat exchange, through the heat exchange unit individually connecting the last-mentioned stage of the first cascade to the last-mentioned stage of the second cascade, thereby to provide substantially all of the heat required at least for further elevating the temperature of the material as aforesaid, and to cool the material in the second cascade.

2. The process of claim 1, wherein the first cascade is positioned above the second cascade and each stage of the first cascade is connected to each stage of the second cascade by the sealed heat-exchange unit.

3. The process of claim 1, wherein each second cascade stage is at a temperature of about 100°–150° C. higher than the temperature of the first cascade stage to which it is connected for heat exchange.

4. The process of claim 3, wherein each heat exchange unit comprises a cluster of heat pipes or thermosyphons.

5. The process of claim 1, wherein additional heat is supplied to lower temperature stages of the first cascade by means of submerged heat exchange coils.

6. The process of claim 5, wherein steam is supplied to said submerged heat exchange coils as waste steam from a steam-powered electric power generator.

7. The process of claim 6, wherein the steam is generated by the burning of a cheap non-noble fuel.

8. The process of claim 1, wherein the uncombined water is removed by means of warm fluidizing air discharging from the cooling and heating cascades.

9. The process of claim 8, wherein hot exhaust gas from the calciner is used to preheat combustion and fluidizing air being fed to the calciner.

* * * * *